United States Patent

[11] 3,602,949

| [72] | Inventor | George A. Kaut<br>Arkon, Ohio |
|---|---|---|
| [21] | Appl. No. | 672,206 |
| [22] | Filed | Oct. 2, 1967 |
| [45] | Patented | Sept. 7, 1971 |
| [73] | Assignee | The Goodyear Tire & Rubber Company<br>Akron, Ohio |

[54] MOLDING APPARATUS AND PROCESS
3 Claims, 4 Drawing Figs.

[52] U.S. Cl. .................................................. 18/39,
249/170, 18/5 P, 18/DIG. 58, 18/2 RM
[51] Int. Cl. .................................................. B29c 5/00
[50] Field of Search .................................................. 18/39, 5 F,
4 C, 4 P, 5 P 2 RM, DIG. 58; 249/134, 148,
149, 170, 171, 172

[56] References Cited
UNITED STATES PATENTS

| 2,351,529 | 6/1944 | Luxenberger et al. | 18/39 |
| 2,732,584 | 1/1956 | Bishop | 18/4 C |
| 2,929,104 | 3/1960 | Hutton | 18/39 |
| 3,056,168 | 10/1962 | Terry | 18/39 UX |
| 3,291,873 | 12/1966 | Eakin | 18/39 X |
| 3,408,695 | 11/1968 | Scott | 18/39 |

*Primary Examiner*—J. Howard Flint, Jr.
*Attorneys*—F. W. Brunner and J. D. Wolfe

ABSTRACT: This invention relates to an apparatus for molding articles which tend to become die locked comprising a support for the mold and a lid support means which is pivotally mounted relative to said mold and support, said lid being pivotally mounted to the support to permit the lid to swing about an axis different from the pivot support whereby the lid may be mounted into closed and open positions relative to the mold.

INVENTOR.
GEORGE A. KAUT
BY J. D. Wolfe
ATTORNEY

INVENTOR.
GEORGE A. KAUT
BY J.D. Wolfe
ATTORNEY

MOLDING APPARATUS AND PROCESS

This invention relates to a mold and method of using said mold to produce a molded foam article having projecting surface contours and/or no mold seams on said projecting surfaces.

In molding articles having curved or irregular shapes extending or projecting away from the main body of the article, difficulty is experienced in removing the molded article from the open mold without damaging the article. This problem is also sometimes referred to as die locking. Consequently, molds having multiple-piece covers are normally used for molding articles of this type with the resulting molded article frequently having a mold parting line in those positions which render the article having unsightly or uncomfortable to the user.

Therefore, an object of this invention is to provide a mold for molding those articles in a multiple-piece mold while controlling the position of the parting line and a method of using said mold to form the desired article.

This object and others may be more readily understood to reference to the drawings wherein.

Figure 1:
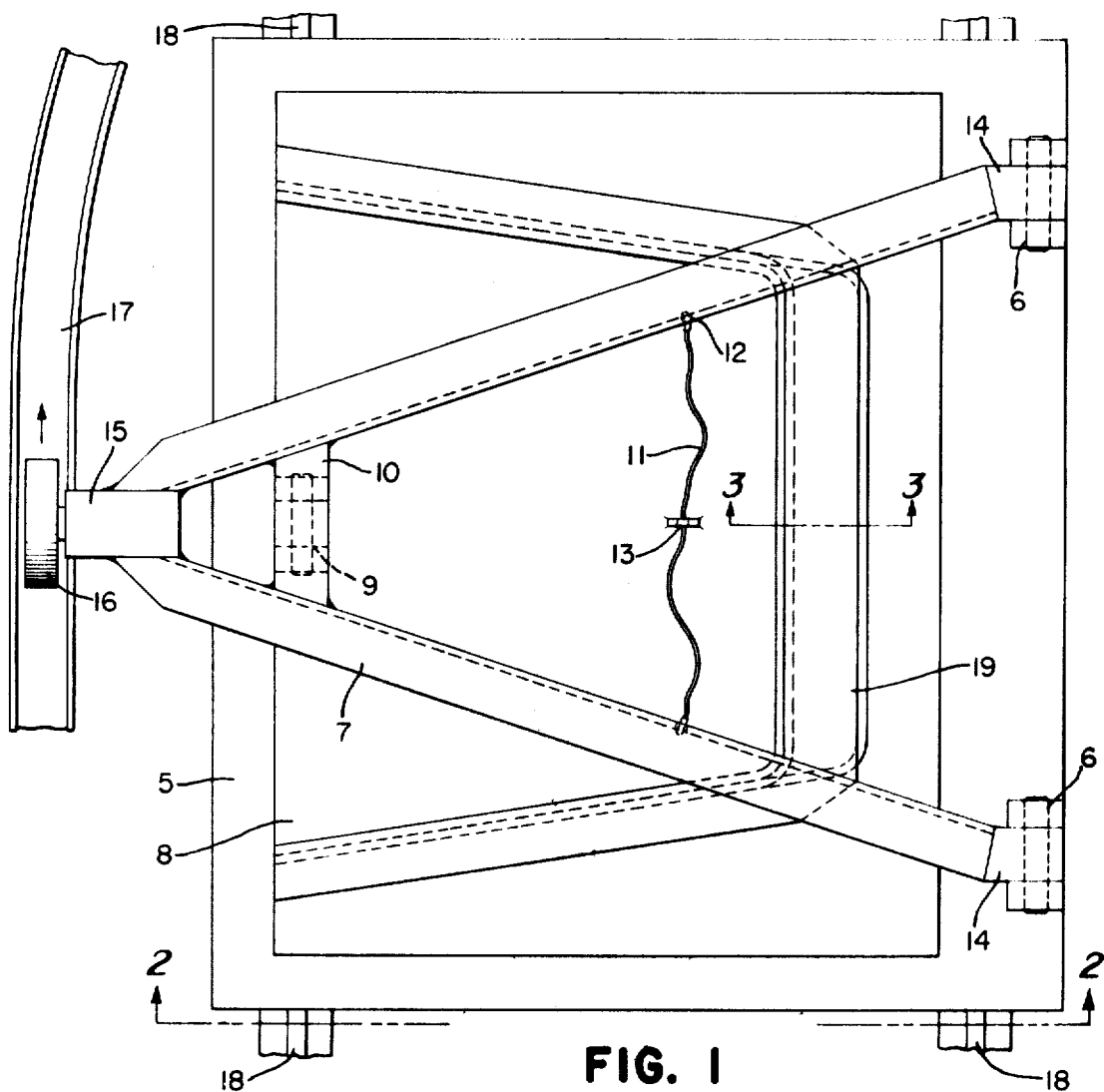
FIG. 1 is a plan view of the closed mold.

FIG. 1 is a plan view of the mold resting on a carrier as the mold moves along a conveyor line. Referring to FIG. 1 more specifically, numeral 5 is the mold carrier containing hinges 6 for pivotably attaching the A-frame 7 to the mold carrier 5. A lid 8 is attached to the A-frame 7 by a hinge 9 in the crossarm or member 10 of the A-frame 7 with the attachment of the lid 8 to the hinge 9 of the A-frame 7 being in the upper portion of the lid 8 and preferably substantially in the manner shown in the drawing, although it should be appreciated that the attachment may be away from the edge so long as the point of attachment is not displaced to the center of gravity of the lid 8. The lid 8 is also attached by a wire cable or other flexible member 11 to the A-frame 7 by means of the flexible member 11 which is attached to the like 8 at the position 13 and to the A-frame 7 at the positions 12.

Figure 2:
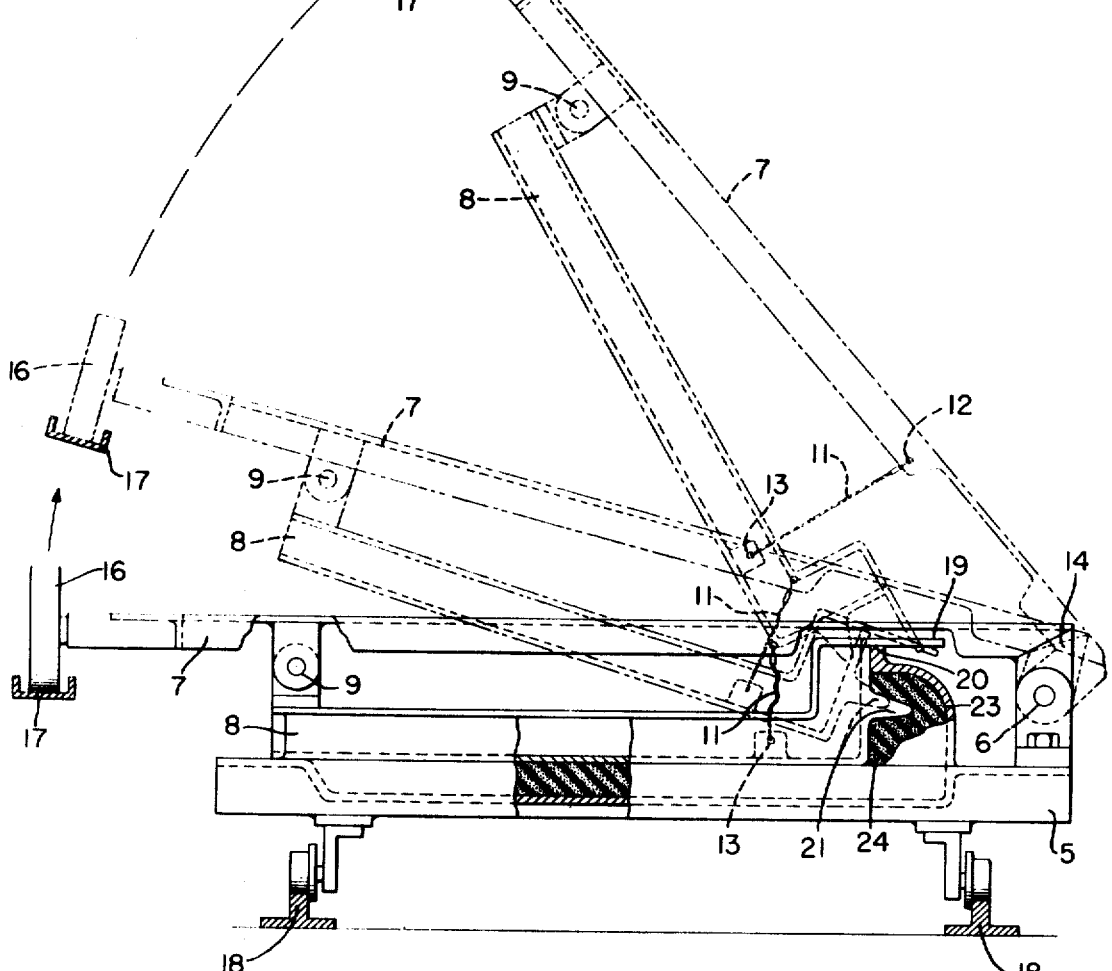
FIG. 2 is a side elevational view along line 2—2 of FIG. 1 showing the lid in the open position.

The A-frame is connected hingeably at its bases 14 to the mold carrier 5 by the hinges 6. The head 15 of the A-frame 7 has a member that terminates with a rotatable bearing wheel 16 which rolls along a track 17 associated with the conveyor line 18 to automatically open and close the lid 8 when desired. This opening and closing of the lid 8 being in response to the curvature of the track 17 to thereby allow the lid 8 to be raised and lowered to either rest in a closed position or an open position as is best seen in FIG. 2.

As the mold is automatically moved along the tracks of the conveyor line 18 the rotatable bearing wheel 16 moves along the track 17. Thus, the A-frame 7 will be lowered or raised depending upon the curvature of the bearing track 17. Thus, at any point on the track 17 between its minimum and maximum height above the conveyor line 18, the A-frame 7 will be in an intermediate position similar to the one shown in FIG. 2 in dotted outline. Accordingly, the lid 8 is free to pivot about hinge 9 until the lower part 19 of the lid 8 either hangs suspended with the cable 11 taut and the lid 8 displaced substantially its maximum distance away from the A-frame 7 at its lower extremity or the lid at the die-locked end of the mold rests on the lip 20 of the mold cavity 23.

Figure 3:
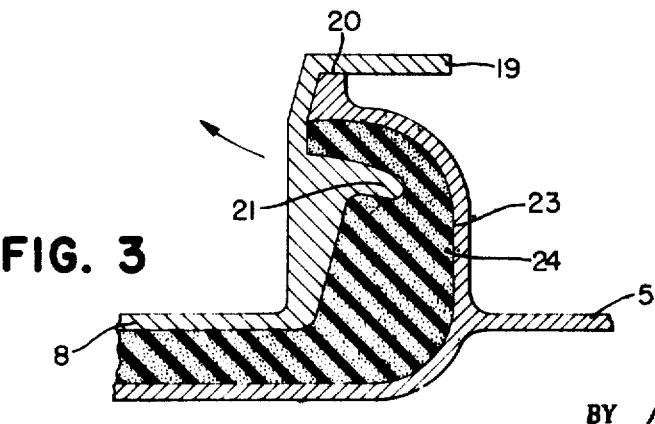
FIG. 3 is an enlarged fragmentary view along line 3—3 of FIG. 1.

As the mold is moved along the conveyor line 18 the bearing wheel 16 which resides in contact with the track 17 will slowly move the A-frame 7 from its maximum height downward. As the A-frame 7 initially moves downward from its maximum height, the lid 8 can move away from the A-frame by pivoting about the hinge pivot 9 until the cable 11 becomes taut. With the lid suspended with cable 11 taut, the projection 21 associated with the lid can clear the lip 20 of the cavity 23 of the mold when the lower part 19 of the lid rests on the lip 20. Then as the downward movement of the A-frame continues until it reaches its minimum height, the lid comes to rest over the cavity 23 of the mold in the manner shown in FIG. 3 to effectively close the mold.

It should be noted that with the mold closed the projecting member 21 has moved back beneath the lip 20 and the molded article 24 formed in the closed mold would be die locked at the die-locked end of the mold except for the feature which permits the lid to pivot as the A-frame moves upward to open the mold.

The moldable material is placed in the mold while the mold is open and then the mold is closed.

Preferably the moldable material where it is foamable, is allowed to foam and fill the mold to form a molded article of the desired configuration. When the molding material has curved sufficiently, the mold is opened as the mold on the conveyor moves along the track 17 which causes the bearing wheel 16 of the A-frame to move upward from its lowest position to its highest position in the manner shown in FIG. 2 depending on the position of the mold carrier 5 on the conveyor line 18. Initially, the upward movement of the A-frame 7 and the lid 8 does not particularly disturb the foam between the lip 20 and the projection 21 of the lid 8 since the lid 8 is free to pivot about pivot point 9 to permit the lower part of the lid 8 to continue to rest on the lip 20 until cable 11 is placed under tension. The pivoting of the lid 8 as the A-frame 7 moves upward initially moves the projection 21 out of contact with groove 22 of the molded article and thereby provides the clearance needed to allow projection 21 to clear the lip 20. Further upward movement of the A-frame 7 toward its maximum position permits the lid 8 to hang suspended beneath the A-frame 7 by the hinge 9 and the cable 11. Therefore, when the lower extremity of the lid 8 is suspended by the cable 11, it then moves upward as the A-frame 7 pivots about pivot points 6, but since the lid 8 is displaced from the A-frame 7 by the cable 11, the lid 8 has a different pivot point under these conditions that allows the projection 21 of the lid 8 to clear the lip 20 of the mold. Thus, as the A-frame 7 reaches its maximum height the lid 8 on he mold will be open and the molded article 24 can be removed from the cavity 23 by grasping it with the hand and pulling the article from the cavity 23 of the mold even though the mold as formed appeared to be die locked at one end of the mold.

Figure 4:
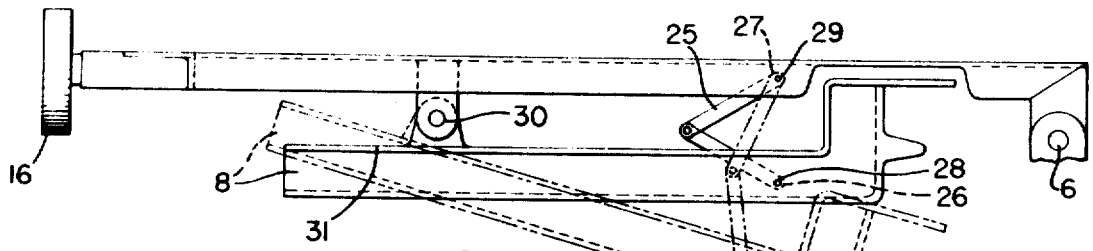
FIG. 4 is a side elevational view of another embodiment showing another means of attaching the lid to the support frame.

Reference to FIG. 4 shows another embodiment where the lid 8 is pivotably attached to the support member with a threeway hinge 25 which has each end 26 and 27 of the hinge 25 pivotably attached to the support and the lid at points 28 and 29 respectively. Also, the hinge 30 at the upper part 31 of the lid is positioned away from the edge of the lid at a point intermediate thereof and the center of gravity of the lid. Thus, with this embodiment the angle between the lid and the support member can be varied as the support member pivots about hinge point 6 to permit the lid 8 to move in and seat in contact with the cavity 23 with projection 21 under the lip 20 of the cavity 23.

In some cases it is desirable to have the hinge 25 spring loaded to keep the lip 20 while in the open position pivoted away from the A-frame 7 to the desired angle. Then when the lower part of the lid 8 contacts lip 20, the spring will be compressed as the lid 8 moves downward to the closed position to thereby move projecting member 21 beneath lip 20.

This molding apparatus can be used with any of the thermoset molding materials but preferably is used to mold foamed articles. Suitable foamable molding materials are the thermoset resins and plastics such as polyvinyl chloride, polystyrene compounded with suitable blowing and curing agents or a polyurethane foamable mixture.

A polyurethane foamable mixture was prepared by mixing 1 mol of a polypropylene ether triol of about 2,500 to 3,00 molecular weight, 1.5 mols of toluene diisocyanate, 0.2 mols of water, catalyst (0.05 percent N-ethyl morpholine, 0.2 percent diethylene triamine and 0.1 percent stannous octoate) and 5 percent Freon 11 in a foam machine.

Sufficient of this polyurethane foamable mixture was poured into the mold to fill the mold. When the foamable mixture has foamed and cured, the lid of the mold as it moved along the conveyor line was closed and then after the foamable mixture had set and cured the mold was opened to permit the molded seat cushion to be removed from the mold.

What is claimed is:

1. An apparatus for molding articles comprising a support for a mold having a cavity that tends to become die locked and a lid-supporting means, said lid supporting means being pivotably mounted relative to said support and having a lid pivotably attached to said support means to maintain a fixed distance between the lid and the lid support means at the pivotable point of attachment but with a variable attachment means at at least one other point to permit the distance between the lid and the lid support means at the other point of attachment to vary to place the pivot of the lower extremity inside and away from the lip of the mold, said lid having a shape that when in the closed position relative to the mold cavity would form a molded article that would tend to be die locked and a means for pivoting the lid support means relative to its support to effect opening and closing of the mold.

2. The apparatus of claim wherein the variable attachment means is a flexible cable.

3. The apparatus of claim 1 wherein the variable attachment means is a multiple, hinged member.

PO-1050
(5/69)

UNITED STATES PATENT OFFICE
CERTIFICATE OF CORRECTION

Patent No. 3,602,949  Dated September 7, 1971

Inventor(s) George A. Kaut

It is certified that error appears in the above-identified patent and that said Letters Patent are hereby corrected as shown below:

Page 1, line 2, change the address of the inventor from "Arkon" to -- Akron --;
Column 1, line 17, delete the word "having";
Column 1, line 22, change "to" to --by --;
Column 2, line 19, change "curved" to -- cured --;
Column 2, line 43, change "he" to -- the --; and
Column 2, line 75, change "3,00" to -- 3,000 -.

Signed and sealed this 9th day of May 1972.

(SEAL)
Attest:

EDWARD M.FLETCHER,JR.
Attesting Officer

ROBERT GOTTSCHALK
Commissioner of Patents